(12) United States Patent
Feldhaus

(10) Patent No.: US 8,157,056 B2
(45) Date of Patent: Apr. 17, 2012

(54) COUPLER FOR LADDER STANDOFF ARRANGEMENT

(76) Inventor: Daniel E. Feldhaus, Delphi, IN (US)

( * ) Notice: Subject to any disclaimer, the term of this patent is extended or adjusted under 35 U.S.C. 154(b) by 364 days.

(21) Appl. No.: 12/651,550

(22) Filed: Jan. 4, 2010

(65) Prior Publication Data

US 2010/0096217 A1   Apr. 22, 2010

Related U.S. Application Data

(63) Continuation-in-part of application No. 11/039,096, filed on Jan. 20, 2005.

(51) Int. Cl.
*E04G 5/04* (2006.01)

(52) U.S. Cl. ....... 182/107; 182/214; 403/78; 403/109.6; 403/378; 403/379.1; 403/379.5

(58) Field of Classification Search ................. 182/107, 182/106, 214; 403/109.6, 378, 379.1, 379.5, 403/78

See application file for complete search history.

(56) References Cited

U.S. PATENT DOCUMENTS

| | | | | |
|---|---|---|---|---|
| 1,483,180 A * | 2/1924 | Keller | | 60/695 |
| 2,599,169 A * | 6/1952 | Finney | | 182/214 |
| 2,797,037 A * | 6/1957 | Niedojadlo | | 182/107 |
| 2,908,345 A * | 10/1959 | Lund | | 182/214 |
| 3,151,511 A * | 10/1964 | Brase | | 81/53.2 |
| 3,459,277 A * | 8/1969 | Frederick | | 182/214 |
| 4,359,138 A * | 11/1982 | Kummerlin et al. | | 182/214 |
| 4,394,887 A * | 7/1983 | Spinks | | 182/214 |
| 4,860,855 A * | 8/1989 | Riley | | 182/106 |
| 5,261,507 A * | 11/1993 | Williams et al. | | 182/214 |
| 5,460,241 A * | 10/1995 | LaBelle | | 182/214 |
| 5,855,252 A * | 1/1999 | Vrolyks | | 182/214 |
| 6,488,439 B1 * | 12/2002 | Lackey, Sr. | | 403/305 |
| 6,691,825 B2 * | 2/2004 | Haig | | 182/107 |
| 2002/0125070 A1 * | 9/2002 | Brown | | 182/106 |

* cited by examiner

*Primary Examiner* — Katherine W Mitchell
*Assistant Examiner* — Daniel Cahn
(74) *Attorney, Agent, or Firm* — Barnes & Thornburg LLP

(57) ABSTRACT

A coupler for a standoff arrangement for ladders and the like. The standoff arrangement comprises a ladder attachment portion and a ladder support portion, with the attachment portion formed to be releasably securable to a ladder and the support portion extending from the ladder attachment portion. The ladder support portion has a pair of individually adjustable bearing arms, and a coupler is installed in each bearing arm to make the bearing arm universally adjustable in relation to the structure against which the ladder standoff arrangement bears.

14 Claims, 5 Drawing Sheets

US 8,157,056 B2

COUPLER FOR LADDER STANDOFF ARRANGEMENT

RELATED APPLICATION

This application is a continuation-in-part of co-pending U.S. patent application Ser. No. 11/039,096, filed Jan. 20, 2005, the disclosure of which is incorporated herein by reference.

BACKGROUND OF THE INVENTION

This invention relates to ladder standoffs, and in particular to a coupler for a ladder standoff arrangement which joins sections of adjustable bearing arms of the standoff arrangement to make the bearing arms universally adjustable to accommodate standing the ladder off from an almost unlimited array of surfaces.

Ladder standoffs, also known as ladder supports, have been developed over the years and are provided with a myriad of forms and shapes. The purpose of a ladder standoff is to perform as its name implies, to stand the ladder away from a structure against which the ladder is being used. Also, ladder standoffs can stabilize a ladder by providing a wider stance against the surface or structure against which the ladder is used.

A particular ladder standoff arrangement is disclosed and described in incorporated pending application Ser. No. 11/039,096. That application discloses a particular means of providing adjustability of bearing arms in the form of a pair of interlocking toothed lug assemblies. The present invention provides a different joining arrangement, in the form of a coupler.

SUMMARY OF THE INVENTION

The invention is directed to a coupler for rotatably joining sections of adjustable bearing arms of a standoff arrangement for a ladder. The coupler comprises a hub and lug engageable in the hub, each of the hub and the lug being connectable to a respective section of an adjustable bearing arm of the ladder standoff arrangement. The hub includes a central cavity shaped to accept the lug, with the cavity having an annular inner wall and a base, with a plurality of aligned pairs of attachment apertures formed in the wall. A seating element is located at the base and is engageable with the lug. The lug includes a head having an annular outer wall shaped to fit within the annular inner wall, and the head has a bore therethrough oriented to align with a selected one of the aligned pairs of attachment apertures. The head has a crown, with the crown having a plurality of intervals shaped to accommodate the seating element.

In accordance with the preferred form of the invention, a fastener is shaped to pass through the bore and a selected one of the aligned pairs of attachment apertures in order to secure the lug in the hub. The fastener is one of a screw, a bolt, a pin or a cotter pin.

The seating element comprises a raised obstruction on the base. Preferably, the raised obstruction comprises a pin which is located in a groove in the base and which passes through a bore in the hub. The intervals in the crown of the head comprise indentations which are shaped to engage the pin.

BRIEF DESCRIPTION OF THE DRAWINGS

The invention is described in greater detail in the following description of an example embodying the best mode of the invention, taken in conjunction with the drawing figures, in which.

DESCRIPTION OF AN EXAMPLE EMBODYING THE BEST MODE OF THE INVENTION

Figure 1:
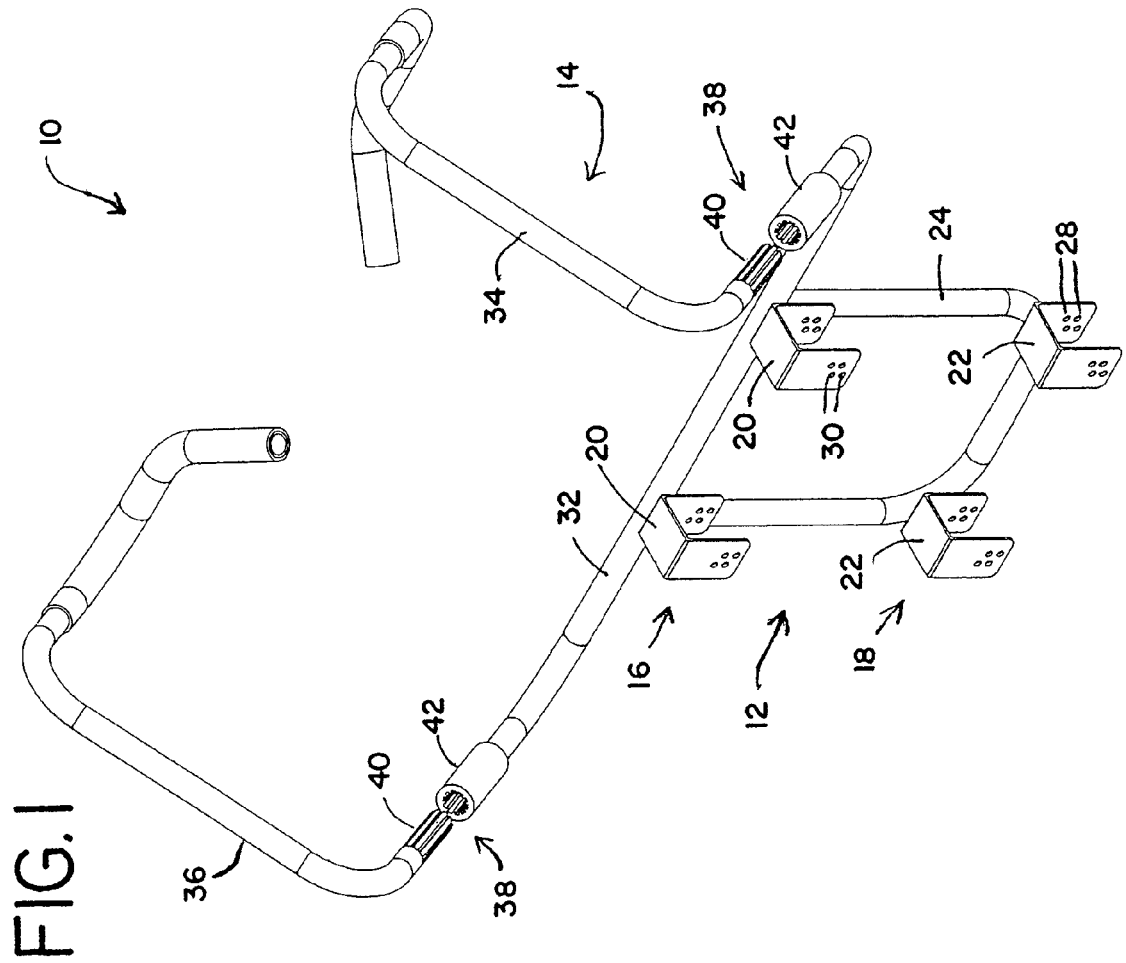
FIG. 1 is a perspective view of a ladder standoff arrangement according to the invention.
Figure 2:
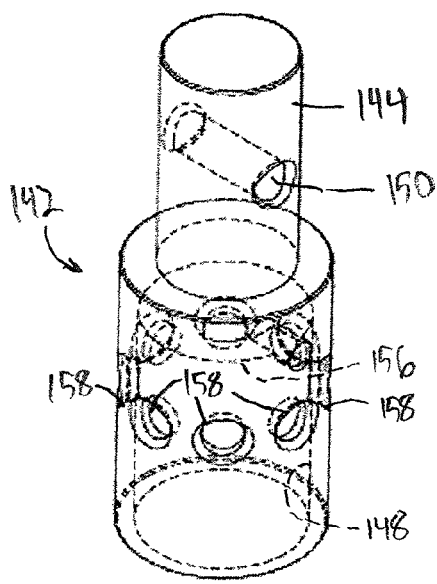
FIG. 2 is an isometric view of a hub according to the invention.
Figure 3:
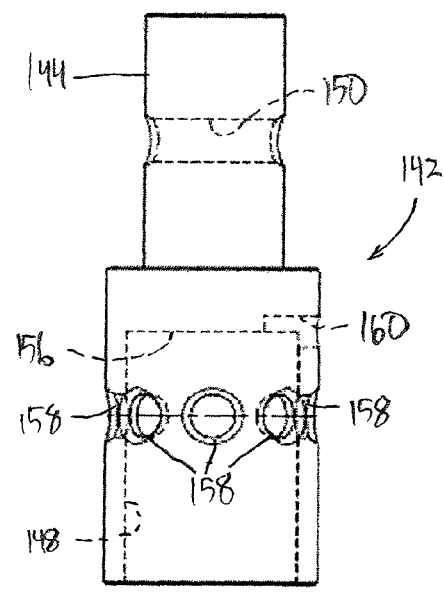
FIG. 3 is an elevational view of the hub of FIG. 2.
Figure 4:
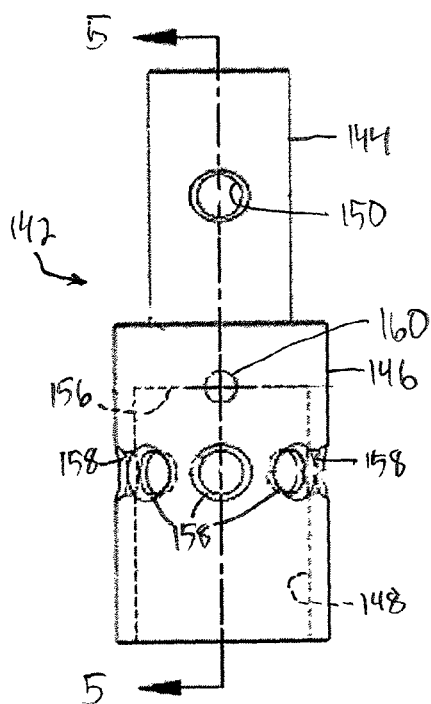
FIG. 4 is an elevational view similar to FIG. 3, but rotated 90°.
Figure 5:
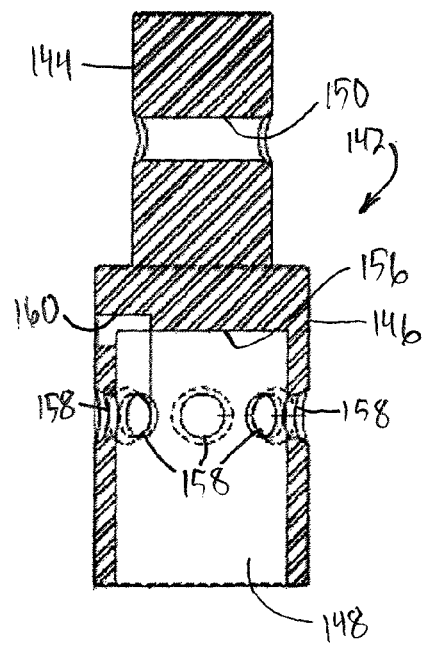
FIG. 5 is a cross-sectional illustration taken along lines 5-5 of FIG. 4.
Figure 6:
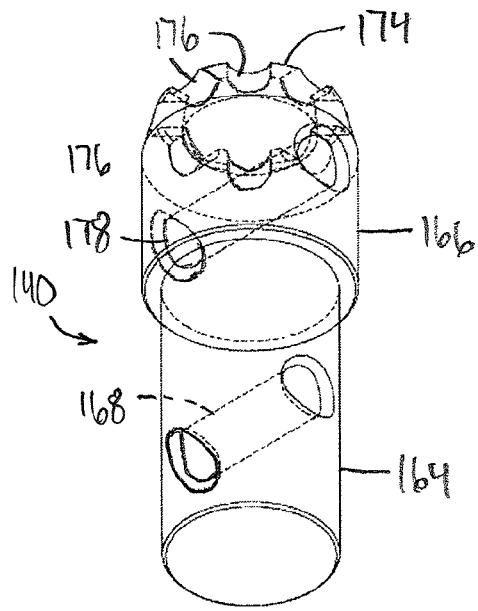
FIG. 6 is an isometric view of the lug according to the invention.
Figure 7:
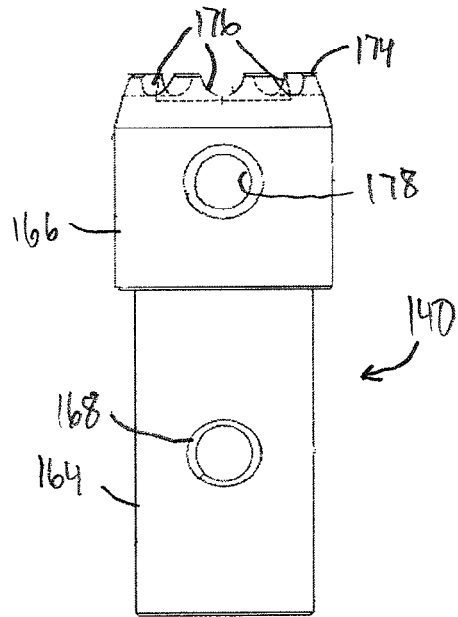
FIG. 7 is an elevational view of the lug of FIG. 6.
Figure 8:
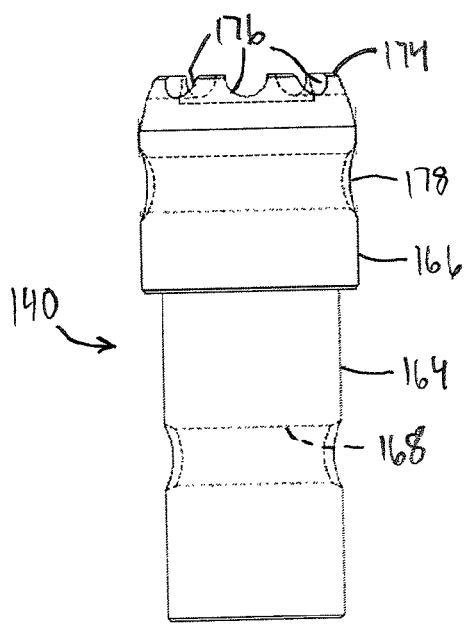
FIG. 8 is an elevational of the lug similar to that of FIG. 7, but rotated 90°.
Figure 9:
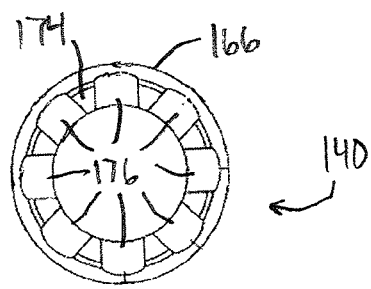
FIG. 9 is a top plan view of the lug of FIGS. 6-8.

A ladder standoff arrangement for employing a coupler according to the invention is shown generally at 10 in FIG. 1. The ladder standoff arrangement 10 consists of two basic components, a ladder attachment portion 12 and a ladder support portion 14.

The ladder attachment portion 12 comprises a pair of spaced bracket assemblies 16 and 18. The bracket assembly 16 is composed of a pair of rung clamps 20 and the bracket assembly 18 is composed of a pair of rung clamps 22, the rung clamps 20 and 22 being mounted on a U-shaped frame 24, which is preferably made of tubular steel. The bracket assemblies 16 and 18 are spaced to engage different rungs of a ladder, as shown in the incorporated application.

It is important that the ladder standoff arrangement, when installed on the ladder, be maintained in place. To that end, and as explained in the incorporated application, preferably a ladder lock is provided. The rung clamps 22 include a series of holes 28 while the rung clamps 20 include a series of holes 30. One or more pins can be installed through any pair of the holes 28 or 30, and a series of the holes is provided for ease of accommodating ladder rungs of varying sizes.

The ladder support portion 14 includes a cross member 32 and a pair of individually adjustable bearing arms 34 and 36 which extend from the cross member 32. Preferably the cross member 32 is welded to the U-shaped frame 24, and the rung clamps 20 and 22 are welded in place, as well, forming a rigid structure. The bearing arms 34 and 36, however, are adjustable, and are removable from the cross member 32 and are mounted thereon by means of a pair of couplers 38. In the first form of the invention shown in the incorporated application, the couplers are composed of a mounting lug 40 and a receiving lug 42. As illustrated, each of the mounting lugs 40 is secured to one or the other of the bearing arms 34 or 36, and the receiving lugs are secured to opposite ends of the cross member 32 although obviously the opposite could also function quite adequately. For the purposes of this description, the coupler 38 will be described as joining sections of the adjustable bearing arms 34 and 36.

A particular coupler according to the present invention is shown and described in greater detail in FIGS. 2-11. The coupler is designated at 138, and comprises a lug 140 which engages a hub 142. The coupler 138 is installed in the ladder standoff arrangement 10 in exactly the same manner as the coupler 38 is installed in the standoff arrangement 10.

Figure 10:
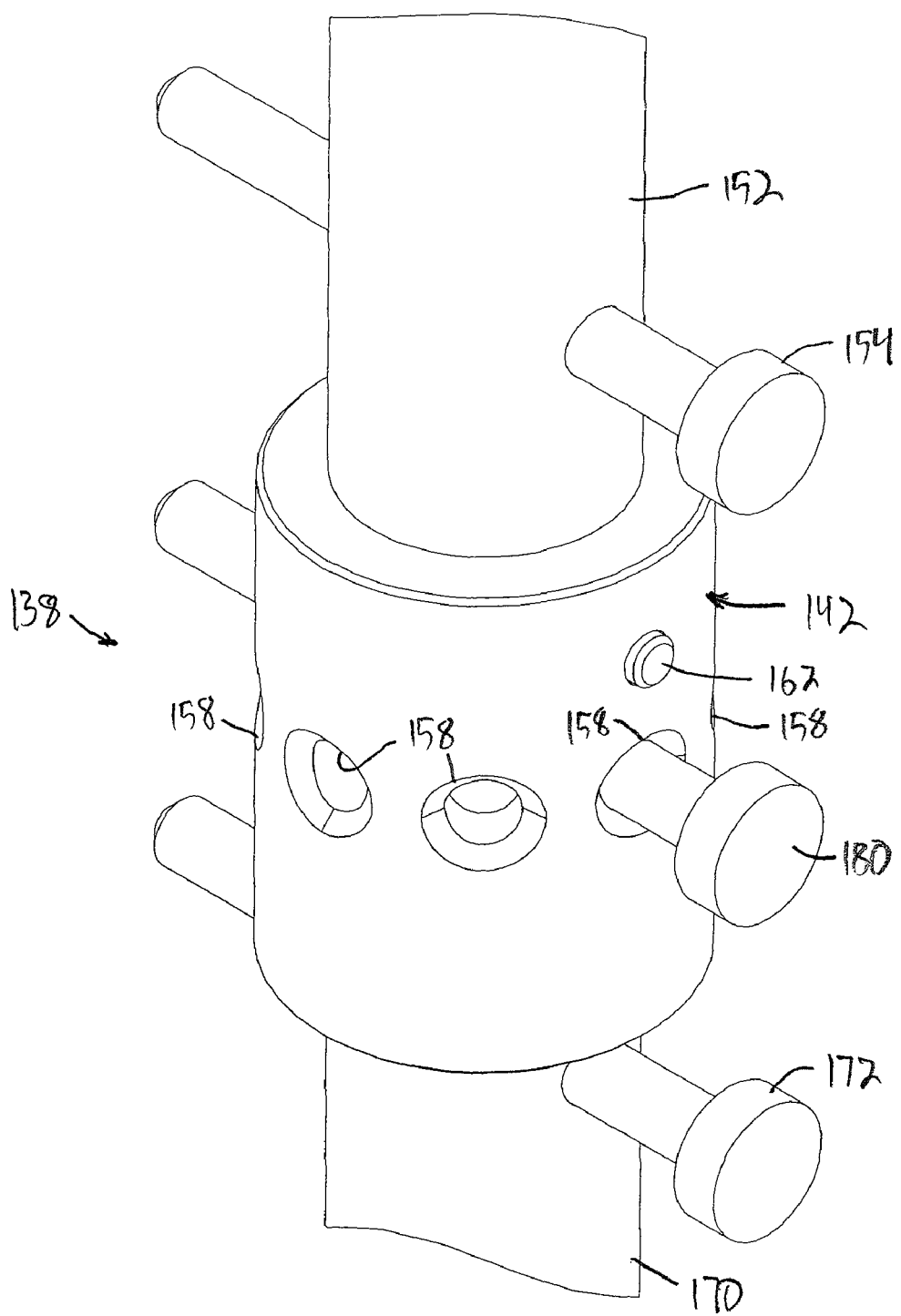
FIG. 10 is an isometric assembly view of the hub and lug, when connected to sections of adjustable bearing arms of a ladder standoff arrangement.
Figure 11:
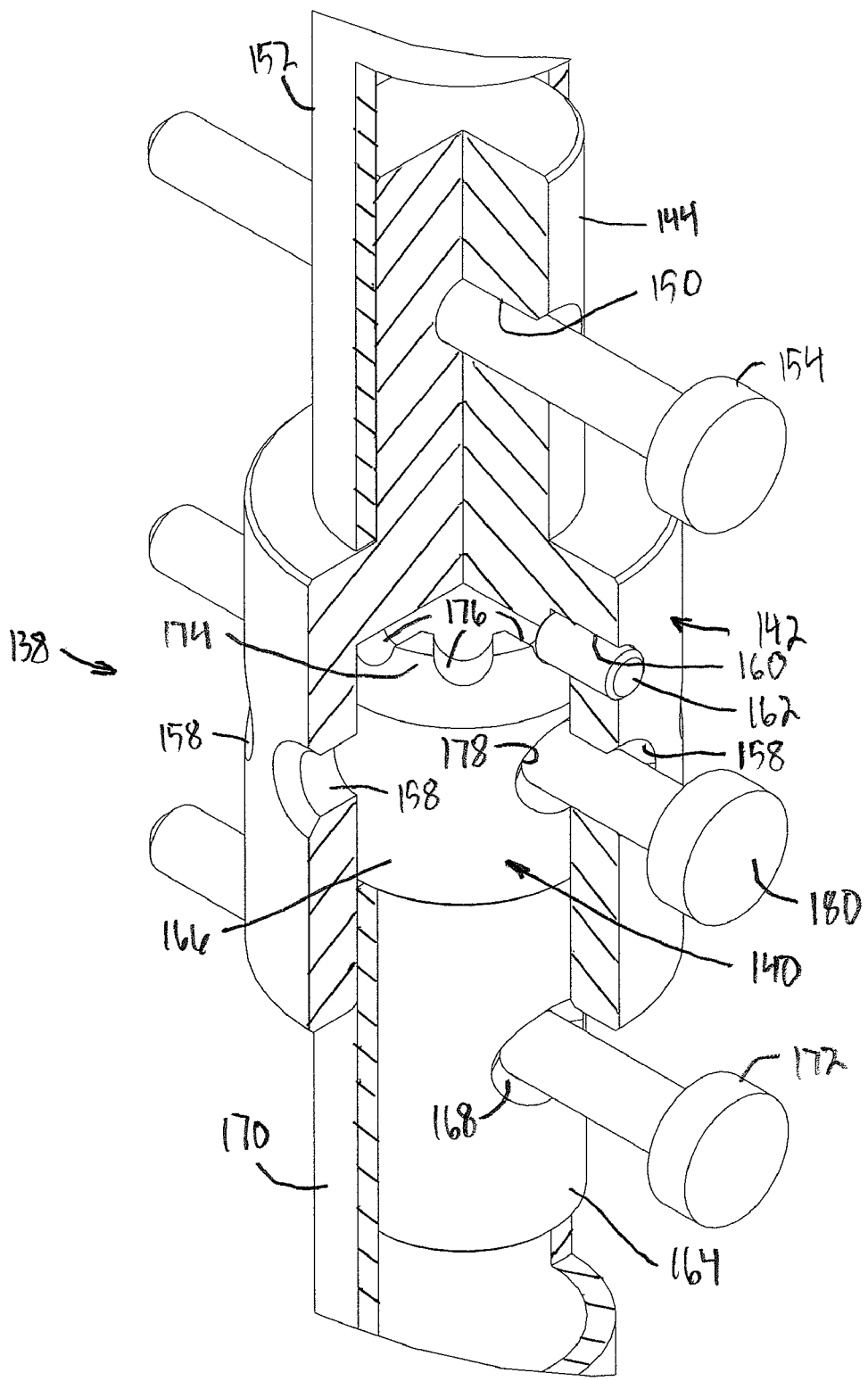
FIG. 11 is a view similar to FIG. 10, but with portions cut away to illustrate detail.

The lug 140 and the hub 142 are shaped to engage in an interlocking relationship as shown in FIGS. 10 and 11, to maintain the bearing arms 34 and 36 in place when the ladder support portion 14 is assembled. Each hub 142, as best shown in FIGS. 2-5, is composed of a shank 144, cylindrical in shape, extending from a cylindrical housing 146 which has a cylindrical central cavity 148. The hub 142 preferably is formed of metal or another robust material that can withstand the rigors of use in a ladder standoff.

The shank 144 is illustrated as being solid, although in some instances it may be sufficiently strong when hollow. It includes a bore 150 therethrough for attachment to a section 152 of a bearing arm of the ladder standoff arrangement, as best shown in FIGS. 10 and 11. A bolt, pin or other connecting means, shown schematically at 154, connects the shank 144 to the section 152. For ease of assembly, the bore 150 may be tapped with a slightly larger entry to facilitate insertion of the bolt 154 during assembly. All bores in the hub 142 and the lug 140 may be similarly formed, as illustrated in the drawing figures.

The central cavity 148 has an annular inner wall as illustrated, with the central cavity 148 extending to a base 156. As illustrated, the housing 146 includes a plurality of aligned pairs of attachment apertures 158 in the wall thereof. The apertures 158 are aligned in pairs, in that one aperture 158 is directly opposite another aperture 158, therefore providing means for securing the lug 140 in the hub 142, as described in greater detail below.

The hub 142 also includes a seating element at the base 156. To this end, a bore 160 extends through the housing 146 into the base 156, forming a groove in a portion of the base 156, as illustrated. A raised obstruction, in the form of a pin 162 (FIGS. 10 and 11) is inserted in the bore 160. The pin is formed and shaped so that when inserted in the bore 160, it normally cannot be removed.

The lug 140 includes a cylindrical shank 164 extending from a head 166. The lug 140 is made of metal or another robust material, and preferably the shank 164 and head 166 are solid so as to be sufficiently robust for use in a ladder standoff arrangement.

The shank 164 includes a bore 168 therethrough so that it may be attached to a section 170 of a bearing arm of a ladder standoff arrangement by means of a bolt, pin or other element, shown schematically at 172 in FIGS. 10 and 11.

The head 166 includes a crown 174, the crown having a plurality of intervals in the form of indentations 176 which are shaped to accommodate the pin 160 when the lug 140 is inserted in the hub 142. When so-inserted, the lug 140 cannot rotate in relation to the hub 142.

Each of the indentations 176 is located to correspond to a pair of the attachment apertures 158. Thus, if there are four pairs of attachment apertures 158 (such as illustrated in the drawing figures), then there are four corresponding indentations 176. For ease of insertion in the hub 142, the lug 140 actually includes eight of the indentations 176, two of the indentations 176 corresponding to each pair of the attachment apertures 158. Obviously there can be as many of the pairs of attachment apertures 158, and corresponding indentations 176 as desired, and the four shown are simply to illustrate one form of the invention.

To retain the lug 140 at a desired location within the hub 142, the head 166 includes a bore 178 therethrough oriented to align with a selected pair of the attachment apertures 158. A bolt, pin or the like, shown schematically at 180 (FIGS. 10 and 11) is inserted through one attachment aperture 158, then through the bore 178 and through the opposite attachment aperture 158, therefore securely retaining the lug 140 within the hub 142, with the pin 162 seated in the corresponding indentation 176, thus preventing rotation of lug 140 relative to the hub 142.

The coupler 138 is used in place of the coupler 38 of the standoff arrangement 10 shown in FIG. 1. To change the orientation of the bearing arms 34 and 36, the bolt 180 is removed, and the arm 34 or 36 can be easily rotated relative to the cross member 32. When the desired new orientation is achieved, the bolt 180 is simply returned, maintaining the bearing arms 34 or 36 in the desired new orientation until a further change is desired.

Various changes can be made to the invention without departing from the spirit thereof, or scope of the following claims.

What is claimed is:

1. A coupler for rotatably joining sections of adjustable bearing arms of a standoff arrangement for a ladder, said coupler comprising
    a. a hub and a lug engageable in said hub, each of said hub and said lug being connectable to a respective section of an adjustable bearing arm,
    b. said hub including a central cavity shaped to accept said lug, said cavity having an annular inner wall and a base, and having a plurality of aligned pairs of attachment apertures in said wall,
    c. a seating element at said base engageable with said lug,
    d. said lug including a head having an annular outer wall shaped to fit within said annular inner wall, said head having a bore therethrough oriented to align with a selected one of said aligned pairs of attachment apertures, and
    e. said head having a crown, said crown having a plurality of intervals shaped to accommodate said seating element.

2. The coupler according to claim 1, including a fastener shaped to pass through said bore and said selected one of said aligned pairs of attachment apertures to secure said lug in said hub.

3. The coupler according to claim 2, in which said fastener is a screw, a bolt, a pin or a cotter pin.

4. The coupler according to claim 1, in which said seating element comprises a raised obstruction on said base.

5. The coupler according to claim 4, in which said raised obstruction comprises a pin.

6. The coupler according to claim 5, in which said pin is located in a groove in said base.

7. The coupler according to claim 5, in which said intervals comprise indentations shaped to engage said pin.

8. A standoff arrangement for a ladder, comprising
    a. a ladder attachment portion and a ladder support portion, the ladder support portion extending from the ladder attachment portion,
    b. the ladder support portion comprising a cross member and a pair of individually adjustable bearing arms extending from said cross member, and
    c. each bearing arm including a coupler for rotatably joining sections of said bearing arm, said coupler comprising
        i. a hub and a lug engageable in said hub, each of said hub and said lug being connectable to a respective section of an adjustable bearing arm,
        ii. said hub including a central cavity shaped to accept said lug, said cavity having an annular inner wall and a base, and having a plurality of aligned pairs of attachment apertures in said wall, iii. a seating element at said base engageable with said lug,
iv. said lug including a head having an annular outer wall shaped to fit within said annular inner wall, said head having a bore therethrough oriented to align with a selected one of said aligned pairs of attachment apertures, and
v. said head having a crown, said crown having a plurality of intervals shaped to accommodate said seating element.

9. The standoff arrangement according to claim 8, including a fastener shaped to pass through said bore and said selected one of said aligned pairs of attachment apertures to secure said lug in said hub.

10. The standoff arrangement according to claim 9, in which said fastener is a screw, a bolt, a pin or a cotter pin.

11. The standoff arrangement according to claim 8, in which said seating element comprises a raised obstruction on said base.

12. The standoff arrangement according to claim 11, in which said raised obstruction comprises a pin.

13. The standoff arrangement according to claim 12, in which said pin is located in a groove in said base.

14. The standoff arrangement according to claim 12, in which said intervals comprise indentations shaped to engage said pin.

* * * * *